April 8, 1924.
B. C. STICKNEY
1,489,616
TYPEWRITING MACHINE
Filed March 28, 1922    2 Sheets-Sheet 1
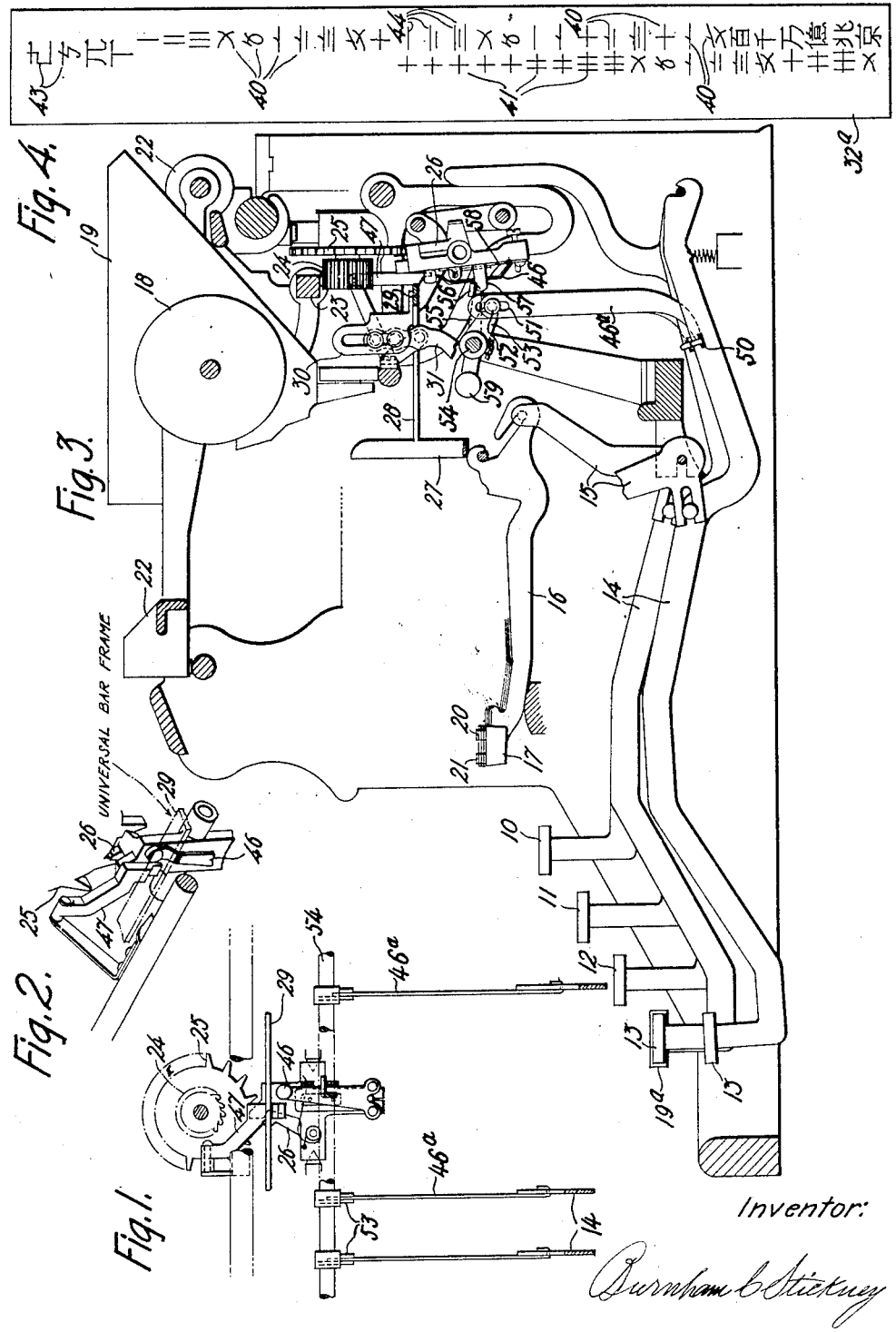
Inventor:
Burnham C Stickney April 8, 1924.                         1,489,616
                    B. C. STICKNEY
                  TYPEWRITING MACHINE
             Filed March 28, 1922    2 Sheets-Sheet 2
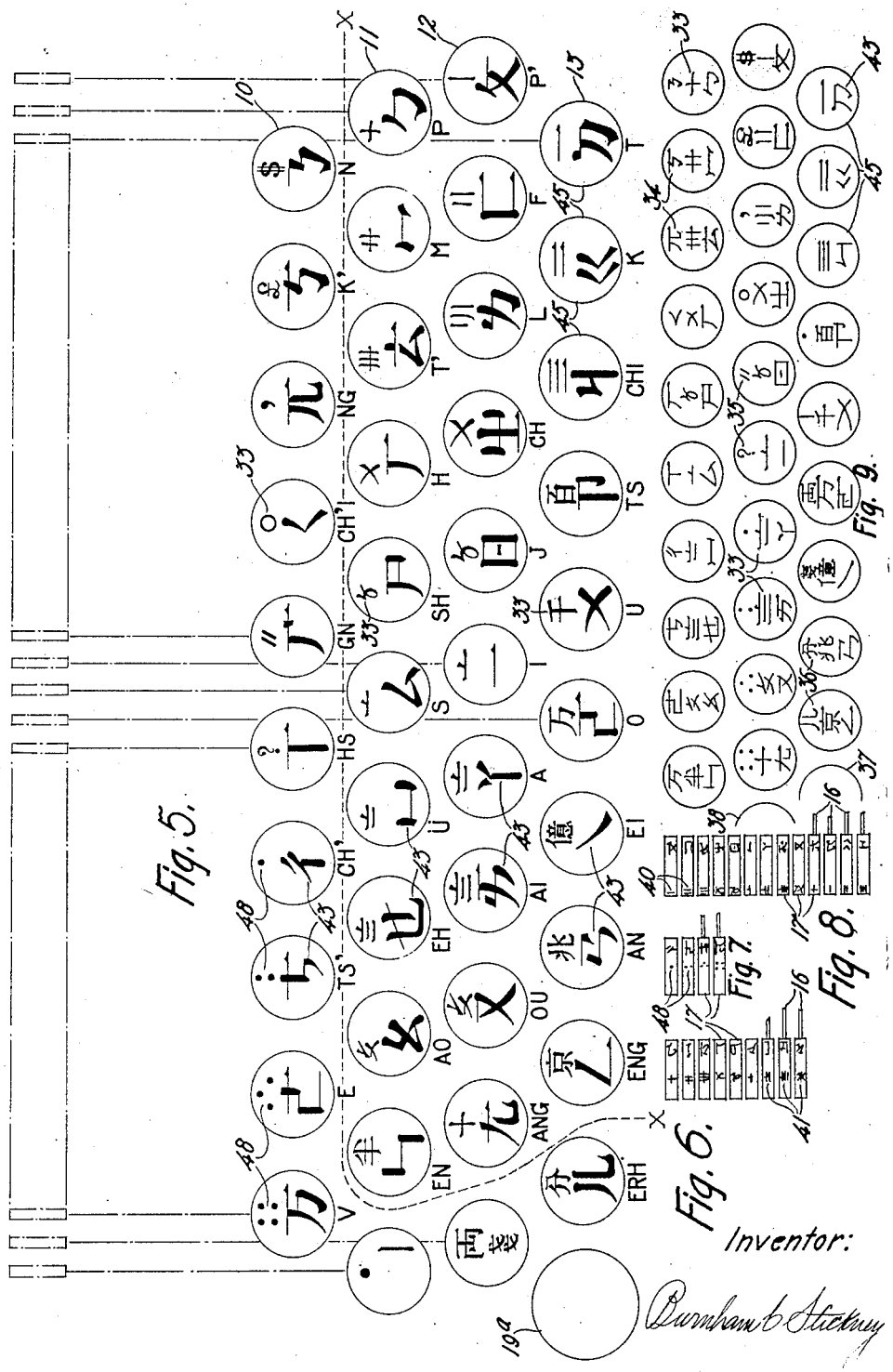

Patented Apr. 8, 1924.

1,489,616

UNITED STATES PATENT OFFICE.

BURNHAM C. STICKNEY, OF ELIZABETH, NEW JERSEY, ASSIGNOR TO UNDERWOOD TYPEWRITER COMPANY, OF NEW YORK, N. Y., A CORPORATION OF DELAWARE.

TYPEWRITING MACHINE.

Application filed March 28, 1922. Serial No. 547,450.

*To all whom it may concern:*

Be it known that I, BURNHAM C. STICKNEY, a citizen of the United States, residing in Elizabeth, in the county of Union and State of New Jersey, have invented certain new and useful Improvements in Typewriting Machines, of which the following is a specification.

This invention relates to a keyboard arrangement for a machine for typewriting the 40-character Chinese phonetic script alphabet, and also to means for typing Chinese commercial numerals.

One of the main objects of the invention is to provide an easily learned keyboard which is adapted for high speed of operation.

To these ends a certain grouping of keys has been devised by which the 42-key keyboard is made up of three sections, one containing the initial consonants, another containing the medial vowels, and a third containing the rhyme endings of the words of the Chinese spoken language, which seldom exceed a monosyllable. Hence the learner, in looking for any key, does not need to search over the entire keyboard, but only the group to which the particular letter or character belongs. This arrangement, moreover, divides the work up with approximate evenness between the two hands, which for the most part may be used in alternation. The group of medial vowels is located at the middle of the keyboard, where it is convenient to operate them by either hand; the initial consonants being covered by the right hand, and the rhyme endings by the left hand. In a four-row keyboard, the keys for infrequently used characters are placed at the rear row, so that the bulk of the work may be done upon the keys in the three front rows, which are readily accessible. The keyboard is easily and quickly learned and manipulated.

Another feature is a provision whereby the frequently used characters aforesaid are limited to twenty-nine keys on said three front rows, for the purpose of having said twenty-nine keys correspond with the keyboard of the Underwood portable typewriter, which has twenty-nine keys in three rows; and further provision is made whereby anybody learning on either keyboard may readily use the other.

Another feature of the invention relates to typing numbers. According to old Chinese methods, each digit or numeral was written directly beneath the foregoing numeral. Special characters were used for 10, 100, 1000, and so on. The number eleven was written, for example, as ten-one; twenty was written as two-ten; six hundred and thirty-four was written as six hundred three ten four; and so on, each component numeral being written under the last. In the Chinese commercial system, however, the characters for ten, twenty, thirty, forty, fifty, sixty, seventy, eighty and ninety are now written in the tens position, or just at the left of the accompanying units, the same as in Arabic or English notation. The present improvement in number-typing comprises means for typing the tens numerals by the side of the units in double columnar arrangement according to the commercial Chinese methods. This result is accomplished by providing an extra set of typefaces for the tens types, and offsetting them so that they will print to the left of the units types; and the improvement comprises further the printing of the tens figures by means of silent keys, so that both a tens numeral and a units numeral may be written with only one letter-feeding movement of the carriage. All of the numeral types belong to the upper-case shift, and provision is made whereby the silent-key mechanism is fully effective only when the machine has been shifted to upper-case position.

Other features and advantages will hereinafter appear.

In the accompanying drawings,

Figure 1 is a front sectional elevation of the escapement mechanism which controls the typewriter carriage, and the means for silencing the same when the parts are in upper-case position and certain of the keys are operated.

Figure 2 is a perspective view of an interponent device seen at Figures 1 and 3.

Figure 3 is a sectional central elevation of the typewriting machine, showing one of the silent keys depressed, and one of the two interponents withdrawn thereby, but without silencing the feed-dog rocker, since it is operated by the other interponent, which remains in effective or normal condition.

Figure 4 shows diagrammatically and enlarged some characters typed on a worksheet by the machine; the first four being ordinary letters, and the remaining ones being commercial Chinese numerals, placed closely together in two columns, the right-hand column containing all the usual numerals, and the left-hand or tens column containing numerals 2, 3, 4, 5, 6, 7, 8, 9 and 10, all of the tens-position numerals being typed by silent keys.

Figure 5 is a plan of the preferred form of a four-row keyboard for the Underwood standard typewriting machine, the Chinese alphabet keys being accompanied by explanatory English designations.

Figures 6 to 8 are diagrammatic plans of special types. Figure 6 shows the types for Chinese numerals 1 (or 10), 2, 3, 4, 5, 6, 7, 8, 9, to be written exclusively in the tens column, and also the lower-case types formed on the same type-heads. Figure 7 shows the tone marks on four of the types, together with the accompanying lower-case characters. Figure 8 shows regular Chinese commercial numerals from 1 to 10, also the old Chinese characters for 1, 2 and 3; all of these being in position to write in units column. Lower-case characters are also shown on the same types. The relatively displaced position of the tens type-faces and the units type-faces on the type-heads will be understood by comparing Figures 6 and 8.

Figure 9 is a diagrammatic representation of a three-row keyboard for an Underwood portable machine, in which the platen is shifted to two different positions from normal or lower-case positions.

In an Underwood standard machine there are four rows of keys, designated as 10 (with ten keys), 11 (with eleven keys), 12 (eleven keys) and 13 (ten keys). These keys operate levers 14, connected by bell-cranks 15 to pivoted bars 16, carrying types 17 which strike rearwardly against a platen 18. The latter is mounted in a frame 19, which is shiftable up and down by a key 19$^a$, to enable the printing of either lower-case types 20 or upper-case types 21; said shifting frame being mounted upon a carriage 22. The carriage has a feed-rack 23 engaging a pinion 24 connected to an escapement-wheel 25, the last controlled by a dog-rocker 26. The dog-rocker is operable by a frame comprising a front universal bar 27, arms 28 and a rear cross-bar 29. Said universal bar 29 carries a device 30 for operating a ribbon-vibrating arm 31 at every type-stroke, to move the ribbon up to cover the printing point, in a known manner.

Chinese characters and letters are typed in vertical columns, beginning at the right-hand side of the work-sheet. To gain this result, the characters are placed in cumbent positions on the type-heads 17, and the work-sheet is set into the machine accordingly, so that the typewriter mechanism may operate in the usual manner, writing a line on the work-sheet which is horizontal when written, but which becomes vertical and readable downwardly upon removing the work-sheet 32$^a$ and giving it a quarter turn to the right, to bring it to the upright reading position seen at Figure 4.

The most frequently used letters are assigned to the three front rows on the keyboard. They are easily and quickly located and reached. Nearly all of the writing may be done upon said three rows.

The frequent initial consonants P, P', M, F, T, T', L, K, H, CH, CHI, SH, J, TS, S are grouped at the right hand of the keyboard, the medial vowels I, U, Ü at the middle of the keyboard, and the rhyme endings A, O, EH, AI, EI, AO, OU, AN, EN, ANG, ENG at the left-hand end of the keyboard. This phonetic alphabet represents the spoken Chinese language, which comprises a few hundred words, principally monosyllabic, and mainly comprising words which do not embody more than an initial consonant, a medial vowel and a rhyme ending. This grouping of the keys conforms with the Chinese right-to-left order, and therefore in locating the keys for a given word the operator will, if the first letter is a consonant, find its key at the right-hand portion of the board, and will find the key for the next character at the middle of the board, and the key for the next or final character at the left-hand end of the board. Hence the keyboard is easily learned, as the general idea of the grouping is instantly mastered, and the field within which to locate a given letter is limited.

The relatively infrequent or little used characters are placed in the back row (10) of keys.

The order of said Chinese phonetic alphabet is as follows: P, P', M, F, V, T, T', N, L, K, K', NG, H, CHI, CH'I, GN, HS, CH, CH', SH, J, TS, TS', S, I, U, Ü, A, E, O, EH, AI, EI, AO, OU, AN, EN, ANG, ENG, ERH.

The keys in these three main rows 11, 12, 13 follow one another in conformity with the order of the Chinese alphabet. It will be observed that the keys are arranged in short files from back to front, the keys P and P' forming the first file, M, F and T forming the second file, T', L and K forming the next, and so on, proceeding from right to left. The order of the Chinese alphabet is followed, beginning at the top of the right-hand file and reading forwardly, then proceeding to the next file to the left and reading in the same manner, and so on, ending with the front key ENG at the left-hand end of the keyboard. The infrequently used keys N, K', NG, CH'I, GN, HS, CH', TS', E and V in the rearmost row (10) may be considered from right to left, and follow substantially the order of the Chinese phonetic alphabet. This arrangement of the four rows brings the most frequently used keys in convenient positions, as, for example, the letter "I" (most frequent of all) is in the middle of the keyboard in the next to the front row. This arrangement also brings such of those types 17 as are frequently used in immediate succession, generally into separated positions in the type-basket so as to avoid clashing; the order of the types being (from right to left) P', P, T, N, F, M, K, K', L, T', CHI, NG, CH, H, TS, CH'I, J, SH, U, GN, I, S, O, HS, A, Ü, EI, CH', AI, EH, AN, TS', OU, AO, ENG, E, ANG, EN, V.

The aforesaid keyboard is at the same time devised with a view to following substantially the same arrangement on the portable machine, so that an operator who has learned to write upon the described standard Underwood four-row keyboard can write Chinese immediately upon an Underwood portable machine, having only three banks of keys, without losing time to master a new arrangement of keys; and this result is secured even though the portable keyboard contains only twenty-nine keys, or eleven less than the number of characters in the Chinese alphabet.

To this end the same alphabetical arrangement is followed in both machines. A selection of twenty-nine keys is made on the forty-two-keyboard, by leaving out of consideration one key at the left-hand end of each of the three front rows 11, 12 and 13. The rear row 10 is also left out of consideration. The principal letters of the alphabet are assigned to the selected twenty-nine keys in said three front rows, which then agree with the three rows of the portable machine. Hence the lower-case character keys on the portable machine may agree exactly with those on the selected portion of the standard machine, so that, having learned either set (Figure 5 or Figure 9), the operator may instantly use the other set. This selected portion of the four-row board is included by the dotted line X—X at Figure 5; such portion being substantially a duplicate of Figure 9. It will be noted that the upper-case characters 33 on the selected three-row portion of the keyboard at Figure 5 are duplicated on the keys at Figure 9. The last mentioned are three-character keys.

The infrequent lower-case letters in the back row 10 on the four-row machine are assignable to the second-shift position at 34 on the rear row of keys on the portable machine, so that, having learned their position upon either keyboard, the operator may readily use the other. The ten punctuation and upper-case characters on the keys of the back row at Figure 5 may be transferred to the second-shift or rearmost position on the second row of the three-row machine, as seen at 35.

The extreme left-hand keys in the front three rows at Figure 5 may bear punctuation and other special characters, and may also include the infrequent character "ERH". The six characters borne by these keys may be disposed in the second-shift positions on six of the front keys in the portable machine, as indicated at 36; said machine having the two usual case-shift keys 37 and 38. Although these positions at 36 are different from the four-row machine, still these characters are infrequently used, and not much time is consumed in locating them.

In the system of Chinese commercial numerals, the right hand is the units position, while the left hand is regarded as the tens position. The problem presented is to write digits in units and tens positions in a column which, in the Chinese custom, reads down the page. In order to use the Chinese alphabet conveniently in a standard typewriting machine, such as the Underwood, the work-sheet 32ª, Figure 4, is given a quarter of a turn edgewise to the left before being inserted in the machine; and the types or type-faces occupy cumbent positions upon the type-bars 16, Figures 6 to 8. Operation of the keys proceeds in the ordinary way, and the paper-carriage 22 feeds to the left. When the sheet 32ª has been removed, it is given a quarter of a turn to the right, to restore it to its reading position, and the characters typed thereon will be found to occupy their normal upright positions, and to read down the page, beginning with the right-hand column. The problem presented in such a machine is to provide convenient means for writing numerals in both units and tens positions in a column reading down the page. This is accomplished by providing one main set of numeral types 40 to write in units position or column, and another set of numeral types 41 to write in tens column.

The numeral types are arranged on the upper-case shift in the machine (it being necessary to hold down the shift-key 19ª when any numeral is being typed), and two types or type-faces 40 and 41 are provided for each of the numerals 1, 2, 3, 4, 5, 6, 7, 8, 9 and 10. By using the two sets of types (one set having keys 12 and the other having keys 11), a double column of numerals may be written, Figure 4, one set of numerals 40 appearing in what may be regarded as the units place, the other set 41 appearing in what may be considered the tens position. The units types 40 are offset a little to the right, and the tens types a little to the left, Figures 4, 6, 7 and 8. The tens types are operated by silent keys 11, so that the carriage 22 does not feed when any numeral is written in the tens column. Hence, by writing any tens digit type and immediately writing a units numeral type, a number may be written in Chinese commercial style, with the tens digit 41 at the left of the units digit 40, Figure 4. Preferably not only the ten digits but also all of the Chinese standard numerals, such as one hundred, one thousand, etc., are placed in the set of types 40 which types in the right-hand or units column.

At Figure 4 the first four characters are E, K', NG and HS. The next ten characters are the Chinese commercial numerals for 1, 2, 3, 4, 5, 6, 7, 8, 9 and 10, these being units and preferably offset a little to the right of the column of main characters or alphabetical letters 43. Below these characters there has been typed, with the aid of silent tens keys 11 and the units keys 12, a double column comprising tens and units numerals. This double column reads as follows: 11, 12, 13, 14, 15, 21, 26, 30, 37, 48, 50, 66, 79, 800, 9000, 100,000 (ten 10,000), 200,000, 3,000,000 and 40,000,000 (four 10,000,000). It will be seen that, by the aid of these types and keys, notation of any numbers may be typed in the Chinese commercial style. In writing such numbers as 11, 12, 13, 21, 22, 23, etc., the units 1, 2 and 3 are represented by special characters 44, which correspond with the old standard Chinese characters. They are typed by means of three keys 45.

The silent-key mechanism for the tens-column numerals is effective only when the machine is shifted to upper-case position, so as not to interfere with the usual operation of the carriage when lower-case letters are being typed by the same keys. The silent-key mechanism usual in an Underwood machine comprises an interponent 46, which is withdrawn by links 46ª connected to the silent keys, so that the ribbon-vibrating universal bar 27 cannot operate the carriage-feeding dog-rocker 26. The present improvement on this feature comprises the use of a second interponent 47, between the universal bar frame 29 and the dog-rocker 26. This interponent 47 is withdrawn only by case-shifting mechanism, at the depression of key 19ª. The dog-rocker cannot be silenced unless the interponents 46 and 47 are both withdrawn. In other words, the shift-key 19ª must be held down while one of the silent keys (comprising the first four keys 48 in the back row 10 and the last nine keys in row 11) is struck.

For writing tone marks, four types or type-faces 49, Figure 7, operated by four keys 48 may be employed, these also being silent keys, and the types 49 being placed on the upper-case shift. These types print at the left of the alphabetical characters 43. A tone mark for the fifth tone may be produced by typing both the 1-tone key and the 4-tone key, thereby printing a group of five dots; the silent-key mechanism preventing feeding of the carriage during this operation.

The usual Underwood silent-key mechanism comprises the links 46ª, which are pivotally connected at 50 to the appropriate key-levers and are slotted at 51 to engage pins 52 provided on arms 53, all of the latter being secured to a transverse rock-shaft 54. From this rock-shaft extends rearwardly an arm 55 having a lip 56 to engage a lug 57 formed upon a slide 58 carrying the interponent 46. Therefore, when any one of the appropriate levers 14 is pulled down, the link 46ª descends and the arm 53 is rocked down, thus rocking the shaft 54 and carrying down the arm 56, which, by means of the lug 57, pulls down the slide 58 having the interponent 46 thereon. This slide 58 is provided with a suitable returning spring (not shown), and the rock-shaft 54 is provided with a returning weight 59.

Variations may be resorted to within the scope of the invention, and portions of the improvements may be used without others.

Having thus described my invention, I claim:

1. A typewriter keyboard for the Chinese phonetic script alphabet, comprising three groups of keys, one group consisting of initial consonants, another group consisting of medial vowels, and the third group consisting of rhyme endings.

2. A typewriter keyboard for the Chinese phonetic script alphabet, comprising three groups of keys, one group consisting of initial consonants at the right-hand side of the keyboard, another group consisting of medial vowels at the middle of the keyboard, and the third group consisting of rhyme endings at the left-hand side of the keyboard.

3. A typewriter keyboard for the Chinese phonetic script alphabet, comprising three groups of keys, one group consisting of initial consonants at the right-hand side of the keyboard, another group consisting of medial vowels at the middle of the keyboard, and the third group consisting of rhyme endings at the left-hand side of the keyboard, the keys in said groups following one another in substantially the order that they follow in the Chinese alphabet.

4. A typewriter keyboard for the Chinese phonetic script alphabet, comprising three groups of keys, one group consisting of initial consonants, another group consisting of medial vowels, and the third group consisting of rhyme endings, said keyboard comprising four rows of keys, the number of keys being about equal to the number of characters in said alphabet.

5. A typewriter keyboard for the Chinese phonetic script alphabet, comprising three groups of keys, one group consisting of initial consonants, another group consisting of medial vowels, and the third group consisting of rhyme endings, said keyboard comprising four rows of keys, the number of keys being about equal to the number of characters in said alphabet, said rows disposed one in front of another, and the back row having infrequently-used characters, whereby the bulk of the spelling is done upon the keys in the three front rows.

6. A typewriter keyboard for the Chinese phonetic script alphabet, comprising three groups of keys, one group consisting of initial consonants, another group consisting of medial vowels, and the third group consisting of rhyme endings, said keyboard comprising four rows of keys, the number of keys being about equal to the number of characters in said alphabet, said rows disposed one in front of another, and the back row having infrequently-used characters, whereby the bulk of the spelling is done upon the keys in the three front rows, the most frequently-used characters being placed upon twenty-nine keys in said three front rows.

7. A typewriter keyboard for the Chinese phonetic script alphabet, comprising three groups of keys, one group consisting of initial consonants, another group consisting of medial vowels, and the third group consisting of rhyme endings, said keyboard comprising four rows of keys, the number of keys being about equal to the number of characters in said alphabet, said rows disposed one in front of another, and the back row having infrequently-used characters, whereby the bulk of the spelling is done upon the keys in the three front rows, the most frequently-used characters being placed upon twenty-nine keys in said three front rows, each of the latter rows having also an additional key at its left-hand end which is infrequently used.

8. A typewriter keyboard for the Chinese phonetic script alphabet, comprising three groups of keys, one group consisting of initial consonants, another group consisting of medial vowels, and the third group consisting of rhyme endings, the arrangement of keys in the initial consonant group being substantially as follows:

```
S  SH  H     T'  M  P
   J   CH    L   F  P'
   TS  CHI   K   T
```

9. A typewriter keyboard for the Chinese phonetic script alphabet, comprising three groups of keys, one group consisting of initial consonants, another group consisting of medial vowels, and the third group consisting of rhyme endings, the arrangement of keys in the initial consonant group being substantially as follows:

```
S  SH  H     T'  M  P
   J   CH    L   F  P'
   TS  CHI   K   T
``` and the arrangement of rhyme endings being substantially as follows:

```
EN   AO  EH
ANG  OU  AI  A
ENG  AN  EI  O
```

10. A Chinese phonetic scrip keyboard substantially as follows:

```
    E    TS'  CH'  HS  GN   CH'I  NG  K'  N
EN  AO   EH   Ü    S   SH   H     T'  M   P
ANG OU   AI   A    I   J    CH    L   F   P'
ENG AN   EI   O    U   TS   CHI   K   T
```

11. A Chinese phonetic script keyboard substantially as follows:

```
    E    TS'  CH'  HS  GN   CH'I  NG  K'  N
EN  AO   EH   Ü    S   SH   H     T'  M   P
ANG OU   AI   A    I   J    CH    L   F   P'
ENG AN   EI   O    U   TS   CHI   K   T
``` the order of the types connected to said keys being, from right to left, substantially as follows: P', P, T, N, F, M, K, K', L, T'. CHI, NG, CH, H, TS, CH'I, J, SH, U, GN, I, S, O, HS, A, Ü, EI, CH', AI, EH, AN, TS', OU, AO, ENG, E, ANG, EN.

12. In a typewriting machine, a set of Chinese numeral types mounted for writing only in the units place, and a set of Chinese numeral types mounted for writing only in the tens place, all of the types being in cumbent positions, the types in one set being similar to those in the other but offset so that the types for the tens set will strike below those in the units set.

13. In a typewriting machine, the combination with a platen and a case-shift mechanism, of a system of type-heads, each having a plurality of types thereon, the types on said heads including a set of lower-case alphabetical letters and a set of upper-case characters, said upper-case characters including two sets of numerals, one set in such relatively offset position on certain type-heads as to print in units place, and the other set in such relatively offset position on other type-heads as to print in tens place.

14. In a typewriting machine, the combination with a platen and a case-shift mechanism, of a system of type-heads, each having a plurality of types thereon, the types on said heads including a set of lower-case Chinese phonetic script alphabetical letters and a set of upper-case characters including two sets of numerals for writing commercial Chinese numbers, one set in such position on certain type-heads as to print in units place, and the other set in such position on other type-heads as to print in tens place.

15. In a typewriting machine, the combination with a platen and a case-shift mechanism, of a system of type-heads, each having a plurality of types thereon, the types on said heads including a set of lower-case Chinese phonetic script alphabetical letters and a set of upper-case characters including two sets of numerals for writing commercial Chinese numbers, one set in such position on certain type-heads as to print in units place, and the other set in such position on other type-heads as to print in tens place, and Chinese types on other type-heads for printing separately 100, 1000 and 10,000 in units place.

16. In a typewriting machine for typing Chinese characters, the combination with a platen and a case-shift mechanism, of a system of type-heads, letter-feeding keys to operate said type-heads, each type-head having a plurality of types thereon, all of said types being in cumbent positions, the types on said heads including a set of lower-case Chinese alphabetical letters and a set of types for typing Chinese commercial numbers, said number types including two sets of numeral types, those in one set offset relatively to those in the other set, so that one set may print in units place and the other set in tens place.

17. In a typewriting machine for typing Chinese characters, the combination with a platen and a case-shift mechanism, of a system of type-heads, letter-feeding keys to operate said type-heads, each type-head having a plurality of types thereon, all of said types being in cumbent positions, the types on said heads including a set of lower-case Chinese alphabetical letters and a set of types for typing Chinese commercial numbers, said number types including two sets of numeral types, those in one set offset relatively to those in the other set, so that one set may print in units place and the other set in tens place, means being associated with the numeral types for the tens-place numerals for omitting the letter-feeding movements of the typewriting machine.

18. In a typewriting machine, a set of cumbent numeral types mounted for writing only in the units place, a set of cumbent numeral types mounted for writing only in the tens place at the side of the types written in the units place, the types in one set being similar to those in the other but offset, so that the types for the tens set will strike below those in the units set, and letter-feeding keys for operating all the types, means being associated with the numeral types for the tens-place numerals for omitting the letter-feeding movements of the typewriting machine.

19. A letter-feeding typewriter for writing Chinese or other numerals, comprising one set of key-operated cumbent types and means to enable them to print in one denominational position, and a second set of cumbent types and means to enable them to print in the next denominational position at the side of those printed in the first denominational position; the second set of types being connected to means to prevent letter-feeding movements at the operation of the keys.

20. A letter-feeding typewriter for writing Chinese or other numerals, comprising one set of key-operated cumbent types and means to enable them to print in one denominational position, and a second set of cumbent types and means to enable them to print in the next denominational position at the side of those printed in the first denominational position; the second set of types being connected to means to prevent letter-feeding movements at the operation of the keys, the units types being so placed on the type-heads that the type-impressions appear a little to the right of the main column of typing, and the tens types being set off a little to the left, so that their impressions appear a little to the left of the main column or line of typing.

21. The combination with a revoluble platen, of cumbent types, type-keys, letter-feeding mechanism controlled by the type-keys, devices controlled by a certain group of said keys to make their type impressions a little to the left of the regular typing position, the keys in said group omitting the letter-feeding operation, and another set of cumbent numeral types operable by other keys and so arranged that their impressions are at the side of the impressions of the first group and a little to the right of the main line or column of impressions.

22. The combination with a revoluble platen, Chinese phonetic cumbent script types, Chinese commercial cumbent numeral types, type-keys, including numeral keys, and letter-feeding mechanism controllable by the type-keys, of devices controlled by a group of said numeral keys to make their impressions a little to the left of the regular typing position, to print in tens place, the keys in said group incapable of effecting letter-feeding movements, another set of cumbent numeral types being so arranged that their impressions are at the side of the impressions of the first group and a little to the right of the regular typing position, to print in units place.

23. The combination with a revoluble platen, Chinese phonetic script types, Chinese commerical numeral types, type-keys, including numeral keys, and letter-feeding mechanism controllable by the type-keys, of devices controlled by a group of said numeral keys to make their impressions a little to the left of the regular typing position, to print in tens place, the keys in said group incapable of effecting letter-feeding movements, another set of numeral types being so arranged that their impressions are a little to the right of the regular typing position, to print in units place, and case-shift mechanism; said phonetic script types being lower-case types, and said numeral types being upper-case types; and provision being associated with the tens-printing keys for operating the letter-feeding mechanism only when the machine is in lower-case position.

24. In a typewriting machine, the combination with a system of upper-case and lower-case types and keys therefor, of case-shifting mechanism, letter feeding mechanism operable by the keys, a ribbon-vibrating mechanism also operable by the keys, a universal bar frame operable by the keys to control said letter-feeding mechanism and said ribbon-vibrating mechanism, said letter-feeding mechanism including a dog-rocker or vibrator, an interponent between the universal bar and the dog-rocker, means controlled by certain of the keys for withdrawing said interponent, and a second interponent between said universal bar and said dog-rocker and connected to said case-shifting mechanism to be withdrawn thereby.

25. In a typewriting machine, the combination with a system of lower-case Chinese alphabet and upper-case numeral types and keys therefor, and a case-shifting mechanism, of letter-feeding mechanism operable by the keys, a ribbon-vibrating mechanism also operable by the keys, a universal bar frame operable by the keys to control said letter-feeding mechanism and said ribbon-vibrating mechanism, said letter-feeding mechanism including a dog-rocker, an interponent between the universal bar and the dog-rocker, means controlled by certain of the keys, including certain of the numeral keys, for withdrawing said interponent, and a second interponent between said universal bar and said dog-rocker and connected to said case-shifting mechanism to be withdrawn thereby.

26. A typewriter for writing numerals, comprising one set of cumbent types and means to enable them to print in one denominational position, and a second set of cumbent types and means to enable them to print in the next denominational position at the side of the impressions printed by the first set of types, the second set of types being connected to means to prevent letter-feeding movements at the operation of the keys, the units types being set off a little to the right, and the tens types being set off a little to the left.

27. In a typewriting machine for typing Chinese characters, the combination with a platen and a case-shift mechanism, of a system of type-heads, bars carrying said type-heads, each type-head having a plurality of types thereon, the types on said heads including a set of lower-case Chinese alphabetical letters and also including a set of types for the Chinese commercial numbers, said number system including two sets of numeral types, those in one set offset relatively to those in the other set, so that one set may print in units place and the other set in tens place.

28. In a typewriting machine for typing Chinese characters, the combination with a platen and a case-shift mechanism, of a system of type-heads, bars carrying said type-heads, each type-head having a plurality of types thereon, the types on said heads including a set of lower-case Chinese alphabetical letters and also including a set of types for the Chinese commercial numbers, said number system including two sets of numeral types, those in one set offset relatively to those in the other set, so that one set may print in units place and the other set in tens place, and letter-feeding keys for said types, means being connected to the numeral types in tens place for preventing letter-feeding movements of the typewriting machine at the operation of the tens-place keys.

BURNHAM C. STICKNEY.

Witnesses:
 EDITH B. LIBBEY,
 JENNIE P. THORNE.